Aug. 24, 1965    L. MICHARD ETAL    3,202,067
FLOORING FOR TAKING-OFF AND LANDING
Filed March 24, 1961
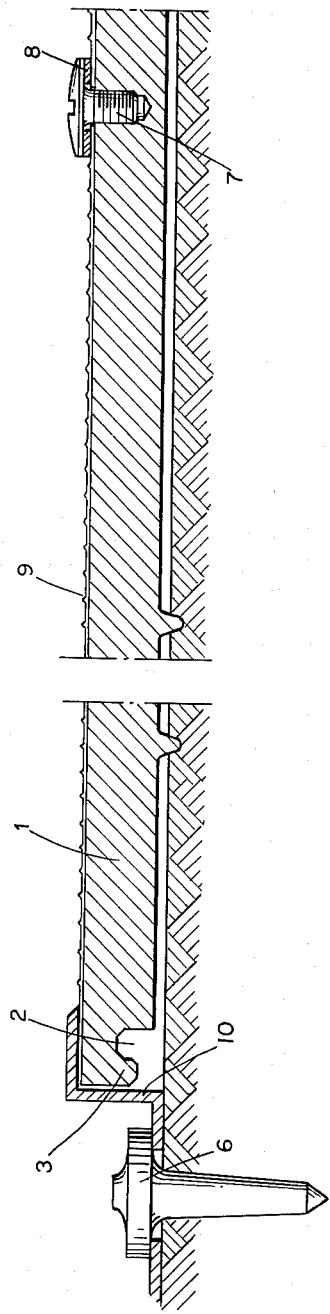
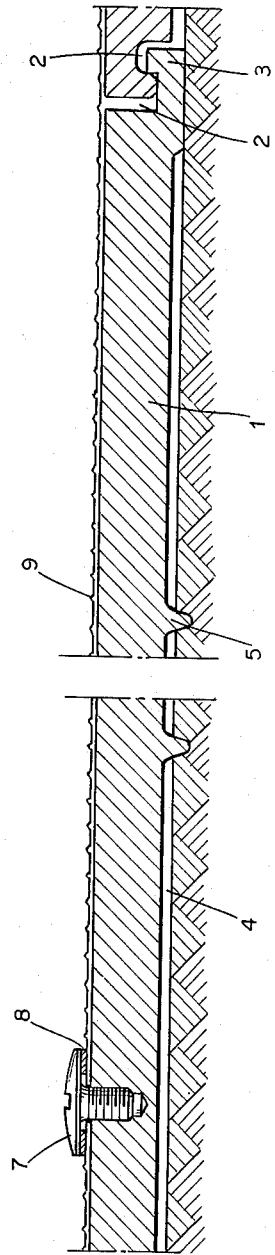
INVENTORS
LOUIS MICHARD
HERMANN OESTRICH
BY Watson Cole, Grindle & Watson
ATTORNEYS 3,202,067
FLOORING FOR TAKING-OFF AND LANDING
Louis Michard, Fontenay-aux-Roses, and Hermann Oestrich, Paris, France, assignors to Societe Nationale d'Etude et de Construction de Moteurs d'Aviation, Paris, France, a company of France
Filed Mar. 24, 1961, Ser. No. 98,151
Claims priority, application France, Mar. 30, 1960, 822,861
4 Claims. (Cl. 94—4)

It has already been proposed to construct take-off floorings by laying down flooring slabs or other prefabricated elements.

The present invention relates to floorings of this kind, more particularly those which are intended for aircraft which take-off and land vertically and which for this reason have the advantage of being of small dimensions.

For reasons of a technical and miliary order, these floorings should satisfy the following essential conditions:

(1) It should be possible to lay and take-up the flooring rapidly with non-specialist labour.

(2) The materials, their form and their method of assembly should be selected so that the parts are light, of relatively small bulk and sufficiently robust so as not to be damaged by repeated assembly and dismantling.

(3) The completed flooring should be able to adapt itself to roughly-levelled ground and should withstand slight settlements of the covered ground, if so required.

(4) Since the pressure of the vertical-lift jet on the surface of the ground can cause the projection into the air of the materials constituting this ground, that is, stones, pieces of pavement, etc., which is liable to result in damage to the aircraft and even to the engine if the air-intake of this latter is not out of reach or protected, it is necessary to provide adequate sealing of the joints against the jet gases.

(5) The flooring should be able to withstand the high temperatures of the lifting jets and the weight of the aircraft, and it is therefore essential that the materials selected should withstand heat and that the joints permit free expansion of the whole flooring, without deformation.

The present invention has for its object a take-off flooring complying with the conditions which have been enumerated above and comprising the combination of a flooring of metallic or like plates with a covering or lining constituted by a metal sheet of small thickness, this covering serving especially to prevent the passage of the gases into the joints.

The description which follows below with reference to the accompanying drawings (which are given by way of example only and not in any limitative sense) will make it quite clear how the invention can be carried into effect, the particular features which are brought out either in the text or in the drawing being understood to form a part of the said invention.

FIG. 1 is a partial vertical cross-section of the peripheral portion of a flooring constructed in accordance with the invention.

FIG. 2 is a similar view of a central portion of the flooring, showing the coupling of adjacent flooring slabs.

The flooring slabs 1 are for example of square shape and are made of cast aluminium alloy. They are juxtaposed so as to cover all the surface necessary, and are assembled to each other by peripheral grooves 2, in which are engaged tongues 3, said co-operating grooves and tongues being formed on the peripheries of the flooring slabs 1.

On the faces in contact with the ground there are provided cavities 4 separated by ribs 5, which prevent irregular seating when laying the floor.

In accordance with the present invention, the flooring slabs are protected from wear and from the heat of the jet by a surface covering, formed for example by a crimped or corrugated sheet 9 of stainless steel of small thickness (for example three-tenths of a millimetre), the length and the width of this sheet being the same as those of the flooring to be covered. This covering has also the function of preventing the penetration of the hot gases into the joints, which, amongst other drawbacks, would be liable to lift the flooring slabs from the ground.

The fixing of this covering is effected over the whole periphery of the flooring area by metal sections 10 fixed to the ground by anchorage members 6; the fixing is completed on the internal surface in the centre of each flooring slab by adequate means such as screws 7 with flattened round heads which project as little as possible from the surface. A joint 8 may be provided round each screw so as to give perfect tightness against gas.

As aforesaid, it is essential that the joints permit free expansion of the whole flooring, without deformation. Convenient joints are provided by vertically interengaging grooves 2 and tongues 3 engaging with a substantial lateral play, as shown, while ribs 5 can glide or shift on the ground and crimped or corrugated stainless steel sheet 9 can extend by flattening to take up the differential expansion of the stainless steel of sheets 9 and the cast aluminum alloy of slabs 1. As stated above, it is essential also that the flooring be able to withstand the high temperatures of the lifting jets. In that respect, stainless steel sheet 9 provides an efficient protection for the cast aluminum alloy slabs 1 against the said high temperature.

If necessary, it would be possible to arrange one or more slabs of steel in the centre of the flooring, in the case of particularly hot jets.

It will of course be understood that modifications may be made to the form of embodiment which has just been described, in particular by the substitution of equivalent technical means, without thereby departing from the scope of the present invention.

What is claimed is:

1. A flooring for vertical take-off and landing aircraft of the type having jets directed downwardly and substantially vertically, comprising an assembly of metallic slabs juxtaposed on the ground and assembled to each other by co-operating grooves and tongues with sufficient play around each slab to permit free expansion thereof, said assembly being covered by a single sheet of stainless steel a few tenths of a millimeter thick, said sheet having a length and width which are the same as the length and width of the flooring whereby the whole surface of the assembly of the slabs and the joints between said slabs are covered thereby isolating said slabs and said joints from the blast from said jets, and means extending around the periphery of the assembly and fixed to the ground for clamping the sheet to the assembly.

2. A flooring as claimed in claim 1, wherein the slabs are made of cast aluminum alloy.

3. A flooring as claimed in claim 1, comprising at least one slab made of steel in the center of the flooring.

4. A flooring as claimed in claim 1, in which the sheet is formed with corrugations, and detachable means are provided for fixing the sheet to each plate about the central portion thereof.

References Cited by the Examiner

UNITED STATES PATENTS

| | | | |
|---|---|---|---|
| 1,686,106 | 10/28 | Saives | 94—13 |
| 1,709,923 | 4/29 | Taylor | 94—13 |
| 1,921,822 | 8/33 | Hines | 94—4 |
| 2,018,581 | 10/35 | Small | 94—11 |
| 2,025,815 | 12/35 | Horridge | 94—13 |
| 2,073,814 | 3/37 | Small | 94—11 |
| 2,176,068 | 10/39 | Fischer | 94—11 |
| 2,230,506 | 2/41 | Vissering | 94—11 |
| 2,266,178 | 12/41 | Dubois | 94—13 |
| 2,344,131 | 3/44 | Coryell | 94—4 X |
| 2,377,211 | 5/45 | Cocken | 94—13 |
| 2,478,993 | 8/49 | Wing | 94—13 |
| 2,608,363 | 8/52 | Shumaker | 244—114 |
| 2,742,829 | 4/56 | Bagby | 94—4 |
| 2,956,652 | 10/60 | Liskey | 94—4 |

FOREIGN PATENTS

| | | |
|---|---|---|
| 533,554 | 12/54 | Belgium. |
| 747,177 | 3/33 | France. |
| 1,089,249 | 9/54 | France. |
| 309,055 | 4/29 | Great Britain. |
| 330,952 | 6/30 | Great Britain. |
| 697,620 | 9/53 | Great Britain. |
| 821,549 | 2/56 | Great Britain. |

JACOB L. NACKENOFF, *Primary Examiner.*